United States Patent
Jahkonen

(10) Patent No.: US 8,217,617 B2
(45) Date of Patent: Jul. 10, 2012

(54) POWER SUPPLY APPLIANCE OF A TRANSPORT SYSTEM

(75) Inventor: Pekka Jahkonen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 307 days.

(21) Appl. No.: 12/609,651

(22) Filed: Oct. 30, 2009

(65) Prior Publication Data

US 2010/0109596 A1 May 6, 2010

Related U.S. Application Data

(63) Continuation of application No. PCT/FI2008/000042, filed on Mar. 19, 2008.

(30) Foreign Application Priority Data

May 2, 2007 (FI) .................................... 2007/0342

(51) Int. Cl.
*H02P 1/46* (2006.01)
(52) U.S. Cl. ...................... 318/722; 318/376; 318/400.3
(58) Field of Classification Search ................. 318/722, 318/376, 400.3, 372, 807, 801, 503, 459, 318/468; 363/108; 187/288
See application file for complete search history.

(56) References Cited

U.S. PATENT DOCUMENTS

| | | | |
|---|---|---|---|
| 5,058,710 | A | 10/1991 | Iwasa |
| 5,285,029 | A | 2/1994 | Araki |
| 2002/0179376 | A1 | 12/2002 | Tominaga et al. |
| 2004/0000356 | A1 | 1/2004 | Tsujimoto et al. |
| 2005/0006182 | A1 | 1/2005 | Hall et al. |
| 2007/0272491 | A1* | 11/2007 | Kattainen et al. ............. 187/288 |

FOREIGN PATENT DOCUMENTS

| | | |
|---|---|---|
| EP | 1225150 A1 | 7/2002 |
| EP | 1235323 A1 | 8/2002 |
| WO | WO-2006/069591 A1 | 7/2006 |
| WO | WO-2006/074688 A1 | 7/2006 |

* cited by examiner

*Primary Examiner* — Karen Masih
(74) *Attorney, Agent, or Firm* — Birch, Stewart, Kolasch & Birch, LLP

(57) ABSTRACT

A power supply appliance of a transport system is provided. The appliance includes a power rectifier of the motor, an AC voltage circuit, a control voltage circuit, a power supply circuit of the safety devices, an AC/DC transformer fitted between the AC voltage circuit and the control voltage circuit to supply power from the AC voltage circuit to the control voltage circuit, and a power shaping circuit.

14 Claims, 4 Drawing Sheets

POWER SUPPLY APPLIANCE OF A TRANSPORT SYSTEM

Figure 1:
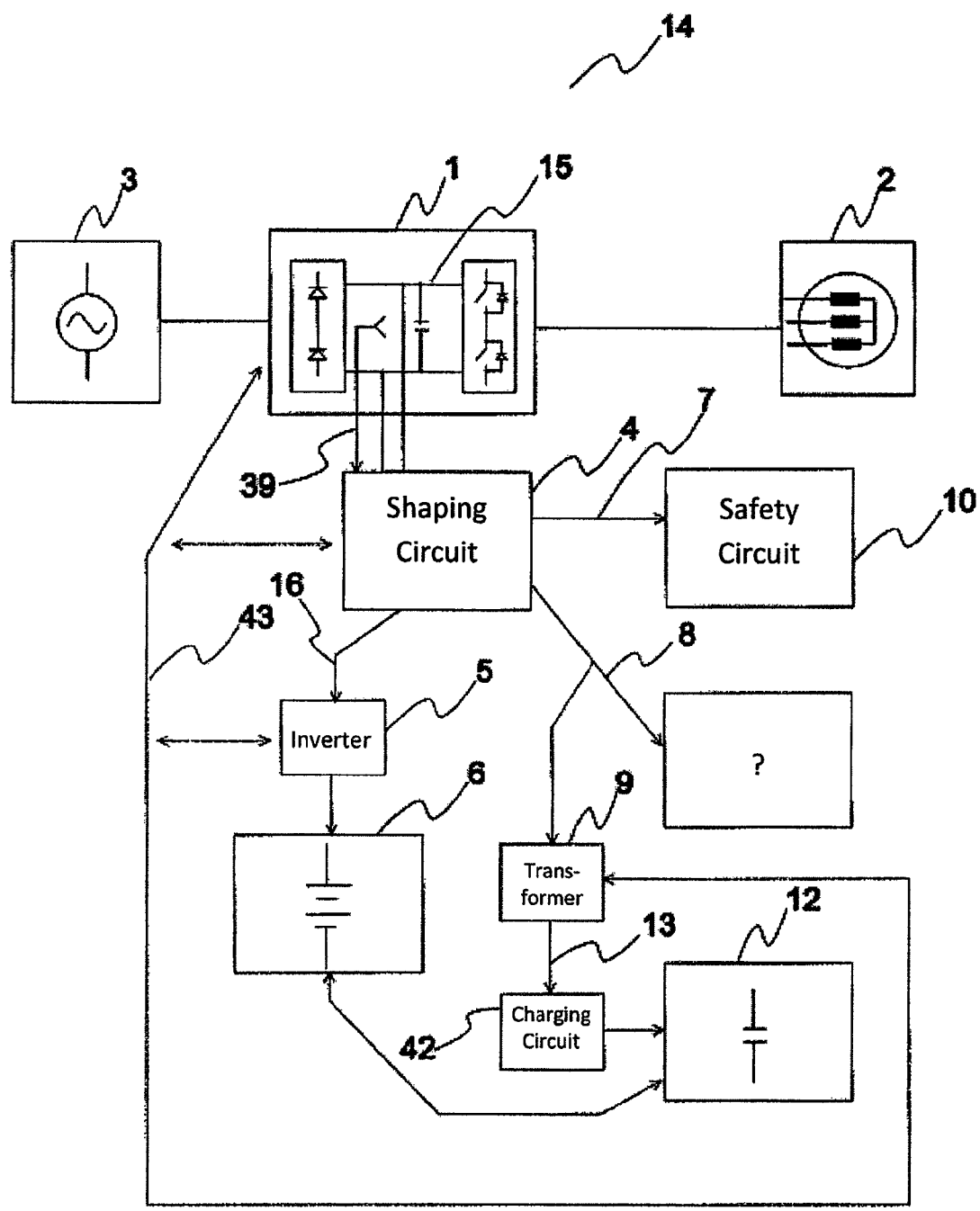

This application is a Continuation of co-pending Application No. PCT/FI2008/000042 filed on Mar. 19, 2008, and for which priority is claimed under 35 U.S.C. §120; and this application claims priority of Application No. 2007/0342 filed in Finland on May 2, 2007 under 35 U.S.C. §119(a), the entire contents of all are hereby incorporated by reference into the present application.

FIELD OF THE INVENTION

The present invention relates to a power supply appliance of a transport system, the power supply appliance including a power rectifier of a motor, an AC voltage circuit, a power supply circuit of safety devices, and a power shaping circuit fitted between a DC intermediate circuit of the power rectifier, the AC voltage circuit, and the power supply circuit.

PRIOR ART

In a transport system power is supplied to the motor for moving the transport appliance and to the electrical system of the transport system. Power supply to the motor generally occurs by means of a frequency converter. Power supply to the electrical system generally occurs with a mains frequency transformer, the primary winding of which is connected to the mains voltage supply of the system. When braking the transport appliance, power also returns from the motor to the frequency converter, where it is generally converted into heat, especially in low-power systems, in a separate power resistor.

The transport system can also be an elevator system. The electrical system of an elevator system comprises an electricity supply for, among other things, the elevator control electronics, as well as for the electrification of the car and of the shaft. Generally a separate protectively-earthed electricity supply for the safety devices of the elevator system is also needed.

Publication U.S. Pat. No. 5,058,710 presents a power supply system of an elevator, in which during normal operation power is taken from the mains voltage supply for the elevator motor, for the electrification of the elevator system, and also for charging accumulator cells. When the mains voltage is disconnected, power starts to be supplied from the accumulator cells both to the DC intermediate circuit of the frequency converter and, converted into AC voltage, to the electrification of the elevator system. Since the electricity supply is taken in a normal situation directly from the mains network, the harmonics of the mains current caused by the electrification manages, however, to pass directly into the mains supply network. When the mains voltage is disconnected the intermediate circuit voltage is determined according to the voltage of the accumulator cells, and because the voltages of prior-art accumulator cells are considerably lower than the voltage of the mains voltage supply, also the control voltage of the motor remains low, which makes regulation of the motor more difficult.

Publication U.S. Pat. No. 6,827,182 presents a power supply appliance of an elevator system, which comprises an energy storage as well as means for discharging and charging the energy storage. During normal operation of the elevator system power is supplied to the motor from the mains voltage supply, and also to the electrification of the elevator system. The energy storage is in this case charged with the means for discharging and charging the energy storage. When the mains voltage is disconnected power is supplied from the energy storage to the intermediate circuit of the frequency converter as well as to the electrification of the elevator system. A problem in this case is, on the one hand, that when the mains voltage is normal the power supply of the electrification is taken directly from the mains, in which case the harmonics of the mains current caused by the electrification passes, however, directly into the mains supply, and, on the other hand, that in this solution the energy storage is not galvanically isolated from the main current circuit, in particular from the negative voltage busbar of the DC intermediate circuit of the frequency converter, in which case the poles of the energy storage are live, and special isolation and protection measures are required in connection with the energy storage.

Publication EP 1235323 A1 presents a power supply appliance of an elevator, which contains an accumulator for emergency supply and a voltage adjustment circuit implemented with switches, reverse-connected diodes in parallel, and also a current supply to the control circuit.

Publication WO 2006/069591 A1 presents a power supply system of an elevator, in which pulse-width modulation with switches is used for regulating the voltage to other devices of the elevator than the motor with the primary windings of the transformer.

PURPOSE OF THE INVENTION

The purpose of this invention is to disclose a simple power supply appliance of a transport system for supplying power from the DC intermediate circuit of the power rectifier of the motor to the electrical system of the whole transport system. It is thus possible to use the braking energy of the motor in the power supply of the electrical system. The supply voltage of the electrical system is AC voltage, which can be regulated. The invention further includes an idea for connecting a separate energy storage as a part of the power supply appliance and for supplying power from the energy storage to the DC intermediate circuit of the power rectifier of the motor, e.g. during emergency drive of the elevator.

CHARACTERISTIC FEATURES OF THE INVENTION

The power supply appliance of the transport system according to the invention is characterized by having power shaping circuit that includes first and second change-over switches fitted as an H-bridge in the DC intermediate circuit, and diodes fitted as an antiparallel circuit in parallel with negative and positive changeover contacts of the change-over switches. Other features of the invention are characterized by a power shaping circuit that includes a transformer comprising a plurality of windings, of which the first winding is fitted to the H-bridge between the center points of the first and the second change-over switch, the second winding is fitted to the AC voltage circuit (8) and the third winding is fitted to the power supply circuit of the safety devices. Some inventive embodiments are also discussed in the descriptive section of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts.

The power supply appliance of a transport system according to the invention comprises the power rectifier of the motor, an AC voltage circuit and a power supply circuit for safety devices. The power supply appliance according to the invention also comprises a power shaping circuit fitted between the DC intermediate circuit of the power rectifier of the motor, the AC voltage circuit and the power supply circuit of the safety devices. The power rectifier of the motor can be a prior-art frequency converter or a power rectifier of a DC motor connected in an H-bridge.

The transport system referred to in the invention can be, for instance, an elevator system, an escalator system, a travelator system or a crane system. The power rectifier of the motor refers to a device that comprises a mains rectifier for rectifying the mains voltage, a DC intermediate circuit and also a power supply circuit for shaping the voltage of the DC intermediate circuit of the power supply circuit for the motor. The AC voltage circuit refers to a circuit with which power is supplied to the electrification of the transport system, such as to the lighting, to the motors of automatic doors, to the control of contactors and other such actuating devices that are not safety devices, as well as further to e.g. the control electronics via the control voltage circuit. The power supply circuit of the safety devices means a circuit that supplies power to the various safety devices of the transport system, such as in an elevator system to the brake control circuit of the machinery brake, to the control coils of the main contactors, to the safety switches, such as the contacts of a landing door, as well as possibly to the power supply circuit of the car brake of the elevator. This power supply circuit of the safety devices is protectively earthed and special safety requirements concerning, among other things, the isolating distances of wires and limitations for surge currents, apply to it. A power shaping circuit refers to a device that supplies power at least between the DC intermediate circuit of the power rectifier of the motor and the electrical system of the transport system.

In one embodiment of the invention the power shaping circuit comprises a first and a second change-over switch fitted as an H-bridge in the DC intermediate circuit of the power shaping circuit of the motor as well as diodes fitted as an antiparallel circuit in parallel with the negative and the positive changeover contacts of the change-over switches. In addition, the power shaping circuit further comprises a transformer comprising a plurality of windings, of which the first winding is fitted to the H-bridge between the center points of the first and the second change-over switch, the second winding is fitted to the AC voltage circuit and the third winding is fitted to the power supply circuit of the safety devices. The center point of the change-over switch refers to the point at which the positive and the negative change-over contact of the change-over switch are electro-conductively connected to each other.

In one embodiment of the invention the power supply appliance comprises the control of the H-bridge as well as a voltage measurement of the DC intermediate circuit of the power rectifier of the motor. The control is fitted to connect the positive change-over contact of the first change-over switch of the H-bridge into a conductive state essentially simultaneously with the negative change-over contact of the second change-over switch as well as the negative change-over contact of the first change-over switch essentially simultaneously with the positive change-over contact of the second change-over switch such that the positive and the negative changeover contact of the first and the second change-over switch are connected in turn into a conductive state for a pre-defined variable time such that as the voltage of the DC intermediate circuit grows, this pre-defined time of the conductive state shortens and as the voltage of the DC intermediate circuit decreases the pre-defined time grows. The time of the conductive state is essentially of the same magnitude during a half-cycle of the positive and negative voltage of the AC voltage circuit.

The control of the H-bridge can be fitted to connect the positive and the negative change-over contact in the first and the second change-over switch into a conductive state in turn once during a half-cycle of the fundamental wave of the voltage. At least 350 Hz can be fitted as the frequency of the fundamental wave of the voltage, in which case the size of the transformer of the power shaping circuit is smaller than when using a prior-art 50 Hz transformer. Fitting the frequency of the fundamental wave of the voltage occurs in this case by selecting the switching frequency of the changeover contacts to be the same as the frequency of the fundamental wave of the voltage.

The power supply appliance of the transport system according to the invention can also comprise an AC/DC transformer, fitted between the AC voltage circuit and the control voltage circuit, which is fitted to supply power from the AC voltage circuit to the control voltage circuit. Control voltage circuit means a DC voltage circuit, of lower voltage than the AC voltage circuit, the voltage of which can be, for instance, 24 volts. From this circuit power is supplied e.g. to the control electronics, as well as possibly to the accumulator cells or to another energy storage, such as a supercapacitor. The control voltage circuit receives its power from the AC voltage circuit supplied by the AC/DC transformer.

In one embodiment of the invention the power supply appliance comprises at least one first energy storage in the control voltage circuit. In this case the AC voltage part of the AC/DC transformer incorporated in the power supply appliance is in the AC voltage circuit and the DC voltage part is in the control voltage circuit, and the AC/DC transformer is fitted to supply power from the AC voltage circuit to the control voltage circuit.

The power supply appliance can comprise accumulator cells and/or a supercapacitor fitted into the control voltage circuit, a charging circuit for charging the aforementioned accumulator cells and/or supercapacitor as well as an inverter, into the DC voltage part of which is fitted a control voltage circuit and into the AC voltage part of which is fitted the second winding of the transformer of the power shaping circuit for supplying power from the control voltage circuit to the power shaping circuit.

The transformer of the power shaping circuit can comprise four windings and the power supply appliance can comprise a second energy storage as well as an inverter, in connection with the DC voltage part of which the second energy storage is fitted and in connection with the AC voltage part of which the fourth winding of the transformer of the power shaping circuit is fitted for supplying power between the energy storage and the power shaping circuit.

In one embodiment of the invention the inverter comprises only an H bridge. In the context of the invention, an inverter can refer to a device that comprises a lower-voltage DC voltage part, a higher-voltage AC voltage part, and between them some voltage boosting solution, such as a voltage-boosting chopper or transformer. On the other hand, in the context of the invention an inverter can also refer to just an H-bridge circuit. If the transformation ratio of the winding fitted in connection with the energy storage of the transformer included in the power shaping circuit is selected to be suitable, such that the voltage level of the winding is the same as the voltage level of the energy storage, just an H-bridge circuit can be fitted between the energy storage and the transformer, and a separate voltage-boosting and voltage-reducing chopper is not needed. In this case the change-over switches of the H-bridge circuit are fitted between the voltage poles of the energy storage, and the winding of the transformer of the power shaping circuit is fitted between the centre points of the change-over switches.

In one embodiment of the invention the power supply appliance comprises a communication channel, which is fitted between at least the power rectifier of the motor, the control of the H-bridge, the AC/DC transformer, the inverter and also possibly the elevator control system. In this embodiment of the invention each of the aforementioned appliances is fitted to read both a start operating command and a stop operating command from the communication channel and to start and stop its operation according to the command.

In one embodiment of the invention the power rectifier of the motor, the control of the H-bridge, the AC/DC transformer and the inverter are fitted to send a fault notification to the communication channel when a defect is detected.

In one embodiment of the invention power is supplied with the inverter from the second energy storage via the fourth winding of the transformer of the power shaping circuit to at least the DC intermediate circuit of the power rectifier of the motor also during acceleration of the transport appliance, in which case the power taken from the mains voltage supply during acceleration of the transport system decreases.

ADVANTAGES OF THE INVENTION

Since it is possible with the power supply appliance according to the invention to supply the braking energy of the motor of the transport system to the electrical system, the efficiency ratio of the transport system improves. In prior-art transport systems, braking energy is converted e.g. into heat in power resistors reserved for the purpose.

In a situation in which the mains voltage supply of the transport system is disconnected, it is possible to supply power with the inverter of the power supply appliance from the energy storage to the winding of the transformer of the power shaping circuit and via this onwards to the electrification of the transport system via the AC voltage circuit, to the power supply circuit of the safety devices of the transport system as well as to the DC intermediate circuit of the power rectifier of the motor via the antiparallel diodes of the H-bridge, in which case the transport appliance can be driven with the motor also during an electricity power cut. For example it is possible to perform an emergency run with the elevator system, in which case in the event of an electricity power cut the elevator car can drive to the nearest exit floor and the passengers are able to leave the elevator car.

With the control of the H-bridge according to the invention it is possible to make the amplitude of the fundamental wave of the supply voltage of the electrical system of the transport system constant. The contactors of the transport system, for example, which are normally dimensioned to withstand 15 percent undervoltage, are controlled with the supply voltage. If, for example, the control voltage of the motor contactors in prior-art systems drops by more than 15 percent when the voltage of the mains supply decreases, the contacts of the contactors start to open and close at high frequency, in which case they are quickly destroyed.

With the power shaping circuit according to the invention it is possible to centrally supply power to the whole electrical system, in which case the number of separate power supply appliances decreases and the system is simplified, in which case also the reliability of the system improves. By means of the power shaping circuit the frequency of the AC voltage can be raised from the 50 hertz of the mains supply frequency to a frequency of up to 400 hertz, in which case the size of the transformer of the power shaping circuit is reduced.

In prior-art transport systems power for the electrical system is generally taken from the mains supply, in which case the harmonics of the current caused by the electrical system manage to pass into the mains supply. In the power supply appliance according to the invention the supply power is taken from the DC intermediate circuit of the power rectifier of the motor, in which case also the current needed by the electrical system is filtered as it passes via the harmonics filter disposed on the mains supply side of the power rectifier of the motor. Thus the harmonics of the mains current caused by the electrical system are minimized. In this case the current is also equally distributed to all the phases of the mains supply, in contrast to e.g. an electrical system taking supply power from only two phases of a three-phase mains supply. The aforementioned harmonics filter of the mains current is stipulated as obligatory under present legislation in many countries.

If the transformation ratio of the winding fitted in connection with the energy storage of the transformer of the power shaping circuit is selected to be suitable, such that the voltage level of the winding is the same as the voltage level of the energy storage, just an H-bridge circuit can be fitted between the energy storage and the transformer, and a separate voltage-boosting and voltage-reducing chopper is not needed.

In prior-art solutions, in which the energy storage is galvanically isolated from the main circuit of the power rectifier of the motor, e.g. by means of a transformer, generally a first rectifier is needed, which supplies power from the DC intermediate circuit of the power rectifier of the motor to the energy storage, as well as also a second rectifier, which supplies power from the energy storage to the main circuit. Both rectifiers need in addition separate transformers, in which case the size of the system increases, as also do the costs.

PRESENTATION OF DRAWINGS

Figure 2:
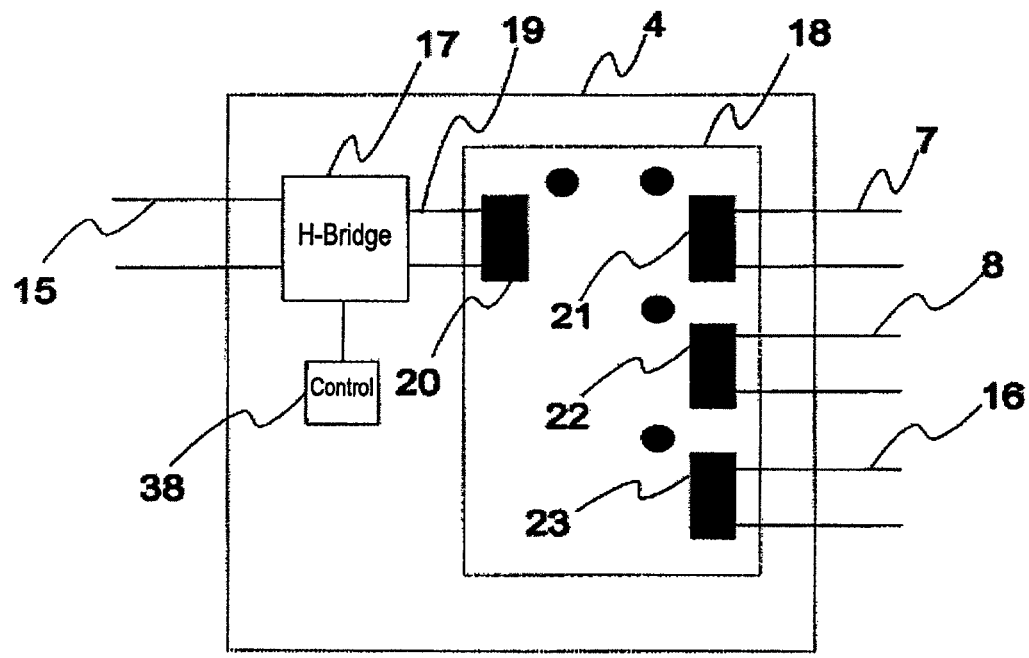
Figure 3:
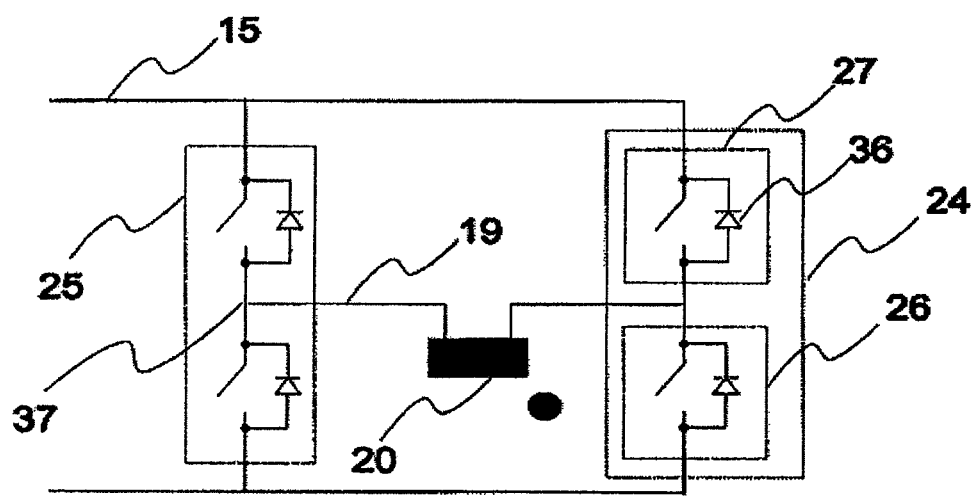

In the following, the invention will be described in more detail by the aid of a few examples of its embodiments with reference to the attached drawings, wherein FIG. 1 presents a power supply appliance of a transport system according to the invention FIG. 2 presents a power shaping circuit according to the invention FIG. 3 presents an H bridge.

Figure 4:
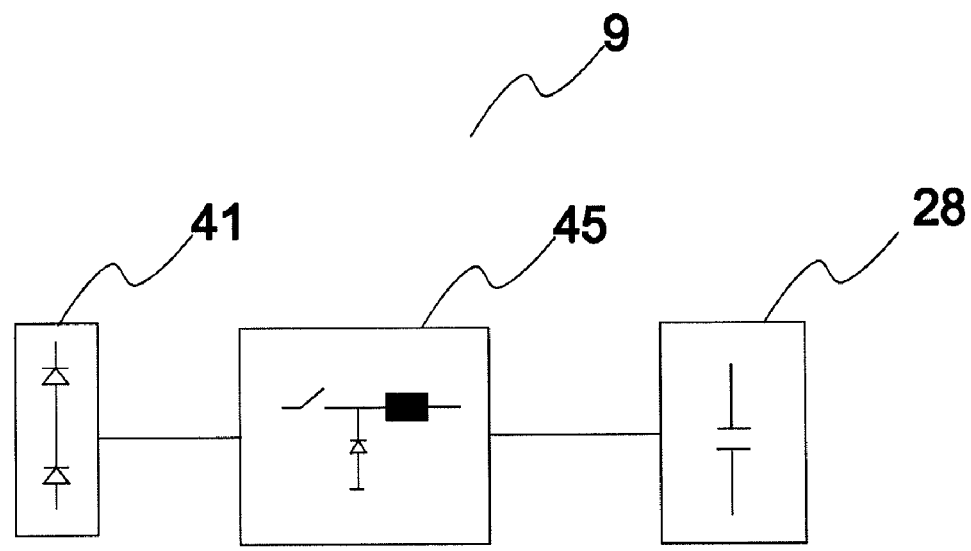

FIG. 4 presents an AC/DC transformer

Figure 5:
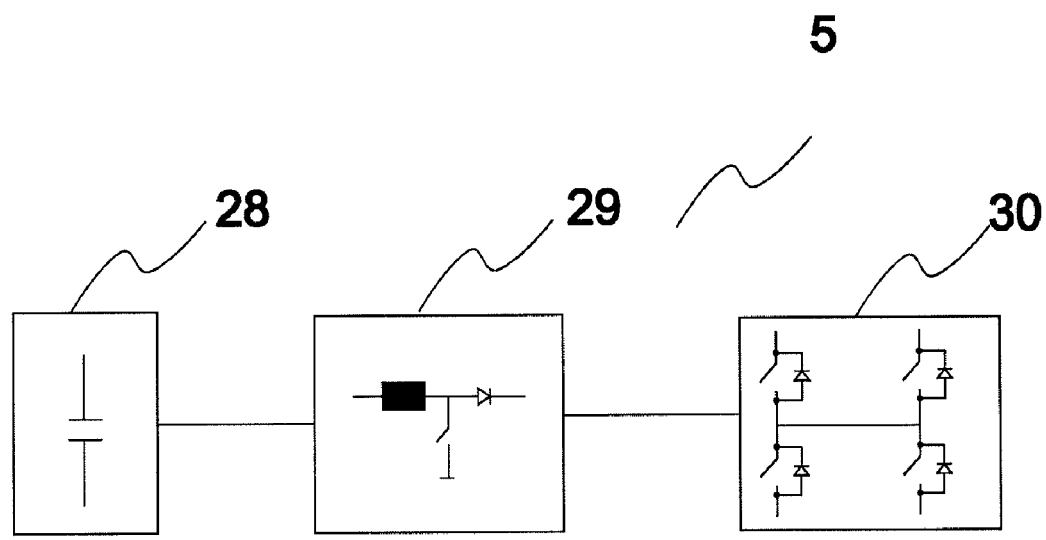

FIG. 5 presents an inverter

Figure 6:
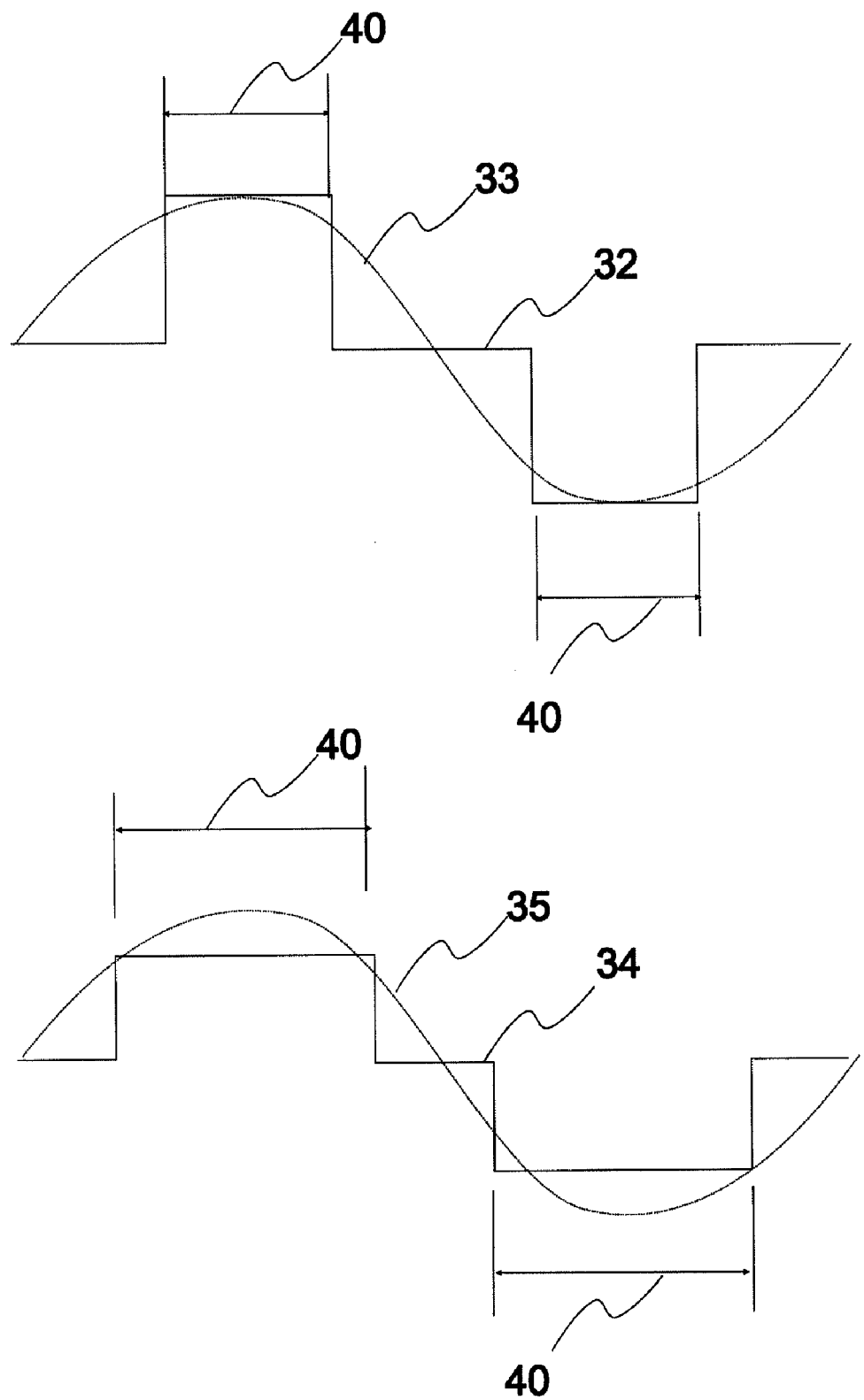

FIG. 6 presents the voltage of an AC voltage circuit and the fundamental wave of the voltage of an AC voltage circuit.

FIG. 1 presents one possible power supply appliance of a transport system according to the invention. FIG. 2 presents the structure of the power shaping circuit 4 in more detail, and FIG. 3 further presents the main current circuit of the H-bridge circuit of the power shaping circuit.

The frequency converter 1 supplies power from the mains voltage supply 3 to the motor 2 that moves the transport appliance. The power shaping circuit 4 is fitted to the DC intermediate circuit 15 of the frequency converter, to the power supply circuit 7 of the safety devices 10, to the AC voltage circuit 8 and also in connection with the inverter 5.

The voltage in the power supply circuit 7 of the safety devices, in the AC voltage circuit 8 as well as in the voltage circuit 16 of the power shaping circuit is AC voltage, and the power shaping circuit comprises a control of the H-bridge, under the control of which the frequency and the amplitude of the fundamental wave of the AC voltage is made constant. During normal operation of the transport system the power shaping circuit 4 supplies power from the DC intermediate circuit of the frequency converter to the power supply circuit of the safety devices as well as to the AC voltage circuit. Additionally, the power shaping circuit supplies power to the second energy storage 6 via the inverter 5, in which case the energy storage charges. The power supply appliance further comprises an AC/DC transformer, which converts the voltage of the AC voltage circuit into DC voltage for the control voltage circuit 13. The effective value of the voltage of the AC voltage circuit is typically 230 volts, and of the control voltage circuit typically 24 volts, for which reason the AC/DC transformer also comprises, in addition to rectification, a chopper, by means of which the voltage of the AC voltage circuit is reduced for the control voltage circuit. The power supply appliance also comprises a first energy storage 12 fitted into the control voltage circuit as well as a charging circuit 42 for charging the energy storage. The first 12 and the second 6 energy storage can be fitted in parallel in connection with the control voltage circuit, or they can be fitted separately from each other, in which case only the first energy storage 12 is disposed in connection with the control voltage circuit 13 and the inverter 5 supplies power only between the second energy storage 6 and the output circuit 16 of the power shaping circuit.

If the mains voltage supply terminates or the mains voltage for some reason decreases so much that the formation of sufficient control voltage for the motor 2 or for the frequency converter 1 is no longer possible, or the amplitude of the fundamental wave of the voltage of the AC voltage circuit 8 no longer remains constant, the control 38 of the H-bridge of the power shaping circuit controls the change-over switches 24, 25 into a non-conductive state and sends a control command via the communication channel 43 to the inverter 5, and on the basis of the control command the inverter 5 starts to supply power from the second energy storage 6 to the fourth winding 23 of the transformer 18 of the power shaping circuit and, via the transformer, onwards to the DC intermediate circuit 15 of the frequency converter, to the power supply circuit 7 of the safety devices and also to the AC voltage circuit 8.

The control 38 of the H-bridge reads the voltage of the DC intermediate circuit 15 of the frequency converter by means of the voltage measurement 39 and controls the negative 26 and the positive 27 changeover contacts of both the change-over switches 24, 25 into a conductive state for a pre-defined time 40. If the measurement 39 of the intermediate circuit voltage shows that the intermediate circuit voltage has decreased, the control of the H-bridge increases the conductive time 40 of the changeover contacts. Correspondingly, when the intermediate circuit voltage grows, the control of the H-bridge reduces the conductive time 40 of the changeover contacts. The control of the H-bridge endeavors, by changing the conductive time of the changeover contacts, to keep the amplitude of the fundamental wave of the AC voltage circuit 8 and, through the transformer, also of the power supply circuit 7 of the safety devices as well as of the AC voltage of the voltage circuit 16 of the power shaping circuit constant.

The frequency converter 1, the control 38 of the H-bridge, the AC/DC transformer 9 and the inverter 5 are fitted to stop or to start their operation on receiving a stop or start request from the communication channel 43. In addition, each of the aforementioned appliances is fitted to send a defect notification to the communication channel when it detects a malfunction in its operation. The elevator control system can also be fitted into the communication channel 43, in which case the elevator control system can send a stop operating or start operating request via the communication channel to a device fitted into the communication channel, as well as receive a defect notification from a device fitted into the communication channel.

In one embodiment of the invention the transformation ratio of the fourth winding 23 of the transformer 18 of the power shaping circuit 4 is selected such that the winding is matched to the same voltage, in terms of the voltage level, as the second energy storage 6. In this case a separate voltage-boosting or voltage-reducing chopper is not needed in the inverter, but instead the main circuit of the inverter can comprise just an H-bridge.

FIG. 4 presents a block diagram of the main current circuit of an AC/DC transformer. The transformer comprises an AC voltage part 41 fitted into the AC voltage circuit, which can be e.g. a rectifying bridge implemented with diodes, a voltage-reducing chopper 45, which can comprise a choke or a transformer as an intermediate storage of energy, and also a DC voltage part 28.

FIG. 5 presents a block diagram of the main current circuit of an inverter. The inverter comprises a DC voltage part 28, possibly a voltage-boosting chopper 29, which can contain a choke or a transformer as an intermediate storage of energy, as well as an AC voltage part, which can be an H-bridge. If the output voltage of the AC voltage part is the same as the voltage level of the DC voltage part, a separate voltage-boosting chopper is not needed, but instead the inverter can comprise just an H-bridge. In this case the change-over switches 24, 25 of the H-bridge are fitted between the voltage poles of the DC voltage part and the AC voltage output is fitted between the center points 37 of the change-over switches.

FIG. 6 presents the voltage 32 of the AC voltage circuit 8 as well as the fundamental wave 33 of the voltage at a first higher voltage of the DC intermediate circuit 15 of the frequency converter as well as the voltage 34 of the AC voltage circuit and the fundamental wave 35 of the voltage at a second lower voltage of the DC intermediate circuit of the frequency converter. At the first higher voltage of the DC intermediate circuit 15 of the frequency converter the active state duration 40 of the positive 27 and the negative 26 changeover contacts of the change-over switches 24, 25 is shorter than at the second lower voltage of the DC intermediate circuit. The increase of the active state duration 40 of the changeover contacts as the voltage of the DC intermediate circuit 15 decreases causes the fundamental wave 33, 35 of the voltage to remain constant irrespective of the voltage of the DC intermediate circuit of the frequency converter.

The invention is not limited solely to the embodiments described above, but instead many variations are possible within the scope of the inventive concept defined by the claims below.

The invention claimed is:

1. A power supply appliance of a transport system, the power supply appliance comprising:
   a power rectifier of a motor,
   an AC voltage circuit,
   a power supply circuit of safety devices,
   and a power shaping circuit fitted between a DC intermediate circuit of the power rectifier, the AC voltage circuit, and the power supply circuit, the power shaping circuit including first and second change-over switches fitted as an H-bridge in the DC intermediate circuit, diodes fitted as an antiparallel circuit in parallel with negative and positive changeover contacts of the change-over switches; and a transformer having a plurality of windings, of which the first winding is fitted to the H-bridge between the center points of the first and the second change-over switches, the second winding is fitted to the AC voltage circuit, and the third winding is fitted to the power supply circuit.

2. Power supply appliance according to claim 1, wherein the transformer of the power shaping circuit includes a fourth winding, and the power supply appliance includes
a second energy storage; and
an inverter,
in connection with a DC voltage part of which the second energy storage is fitted, and
in connection with an AC voltage part of which the fourth winding of the transformer is fitted for supplying power between the energy storage and the power shaping circuit.

3. Power supply appliance according to claim 1 wherein the power supply appliance further comprises a control voltage circuit and an AC/DC transformer, which is fitted between the AC voltage circuit and the control voltage circuit to supply power from the AC voltage circuit to the control voltage circuit.

4. Power supply appliance according to claim 3, the power supply appliance further comprising:
accumulator cells and/or a supercapacitor fitted into the control voltage circuit,
a charging circuit for charging said accumulator cells and/or supercapacitor; and
an inverter,
into a DC voltage part of which is fitted a control voltage circuit, and
into an AC voltage part of which is fitted the second winding of the transformer of the power shaping circuit for supplying power from the control voltage circuit to the power shaping circuit.

5. A power control appliance according to claim 4, where the inverter comprises only an H-bridge.

6. Power supply appliance according to claim 4, the power supply appliance further comprising:
a communication channel, which is fitted between at least the power rectifier of the motor, the control of the H-bridge, the AC/DC transformer, and the inverter such that each of the aforementioned appliances is fitted to read both a start operating command and a stop operating command from the communication channel and to start and stop its operation according to the command.

7. Power supply appliance according to claim 4, wherein the power shaping circuit of the motor, the control of the H-bridge, the AC/DC transformer and the inverter are fitted to send a fault notification to a communication channel when a defect is detected.

8. Power supply appliance according to claim 6, where the communication channel is also fitted to an elevator control system and where the elevator control system is also fitted to read both a start operating command and a stop operating command from the communication channel and to start and stop its operation according to the command.

9. Power supply appliance according to claim 1, the power supply appliance further comprising:
a control of the H-bridge; and
a voltage measurement of the DC intermediate circuit,
and wherein the control is fitted to connect the positive change-over contact of the first change-over switch into a conductive state essentially simultaneously with the negative change-over contact of the second change-over switch as well as the negative change-over contact of the first change-over switch essentially simultaneously with the positive change-over contact of the second change-over switch
such that the positive and the negative changeover contact of the first and the second change-over switches are connected in turn into a conductive state for a pre-defined variable time according to the voltage of the DC intermediate circuit.

10. Power supply appliance according to claim 9, wherein the control of the H-bridge is fitted to connect the positive and the negative change-over contact in the first and the second change-over switches into a conductive state in turn once during a half-cycle of a fundamental wave of the voltage.

11. Power supply appliance according to claim 9 wherein a fundamental wave of the voltage has a frequency of at least 350 Hz.

12. Power supply appliance according to claim 10 wherein at least 350 Hz is fitted as the frequency of the fundamental wave of the voltage.

13. A power supply appliance of a transport system, the power supply appliance comprising:
a power rectifier of a motor,
an AC voltage circuit,
a power supply circuit of safety devices,
a control voltage circuit;
an AC/DC transformer, which is fitted between the AC voltage circuit and the control voltage circuit to supply power from the AC voltage circuit to the control voltage circuit;
and a power shaping circuit fitted between a DC intermediate circuit of the power rectifier, the AC voltage circuit, and the power supply circuit, the power shaping circuit including
first and second change-over switches fitted as an H-bridge in the DC intermediate circuit,
and diodes fitted as an antiparallel circuit in parallel with negative and positive changeover contacts of the change-over switches.

14. Power supply appliance according to claim 13, wherein the control voltage circuit includes at least a first energy storage,
the AC voltage part of the AC/DC transformer is in the AC voltage circuit and the DC voltage part of the AC/DC transformer is in the control voltage circuit, and
the AC/DC transformer is fitted to supply power from the AC voltage circuit to the control voltage circuit.

* * * * *